March 8, 1960 L. L. REED ET AL 2,927,707
MACHINE FOR REMOVING BAKED GOODS AND THE LIKE FROM PANS
Filed May 6, 1957 6 Sheets-Sheet 1
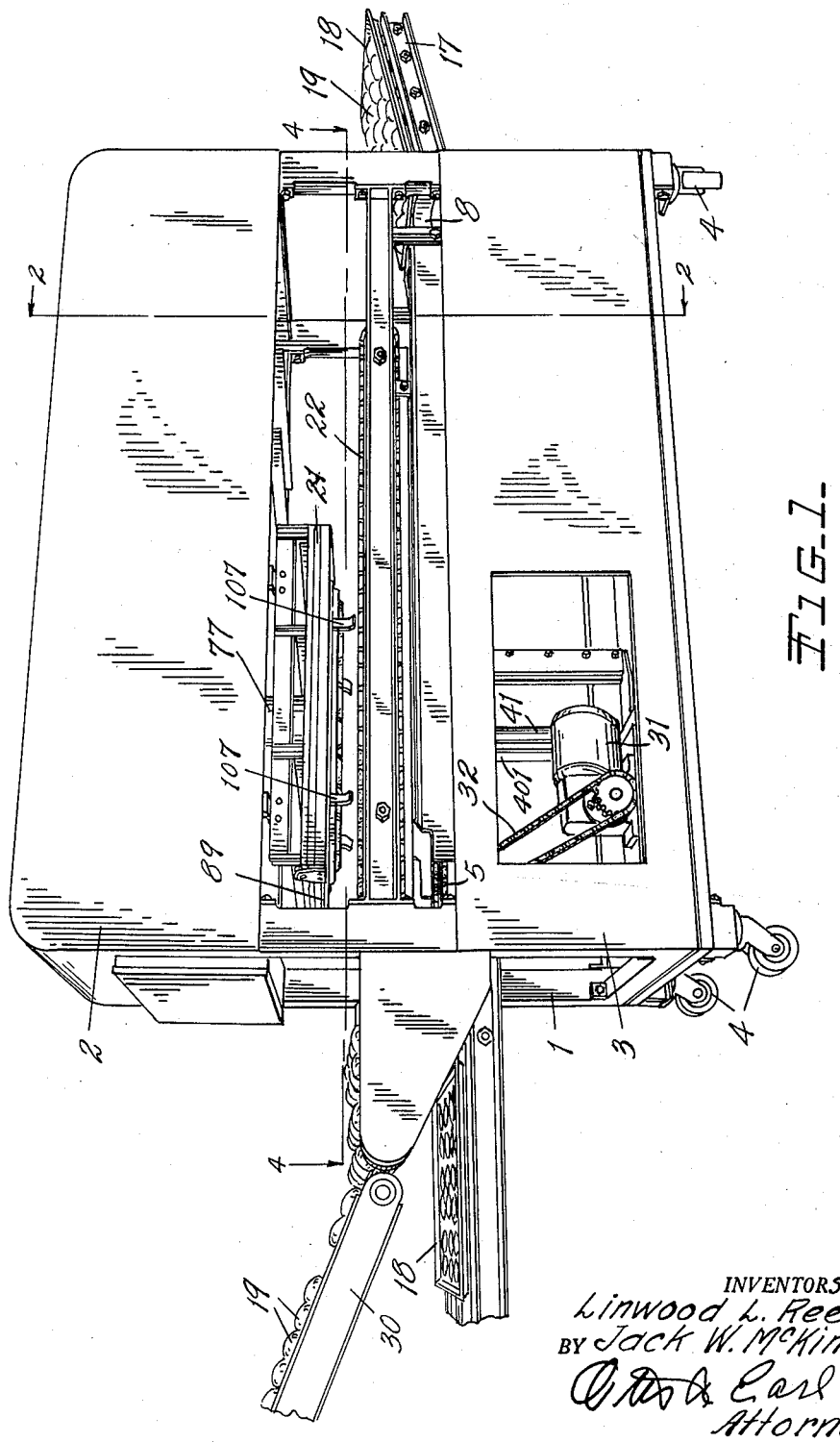
FIG. 1.
INVENTORS
Linwood L. Reed
BY Jack W. McKim
Attorney.

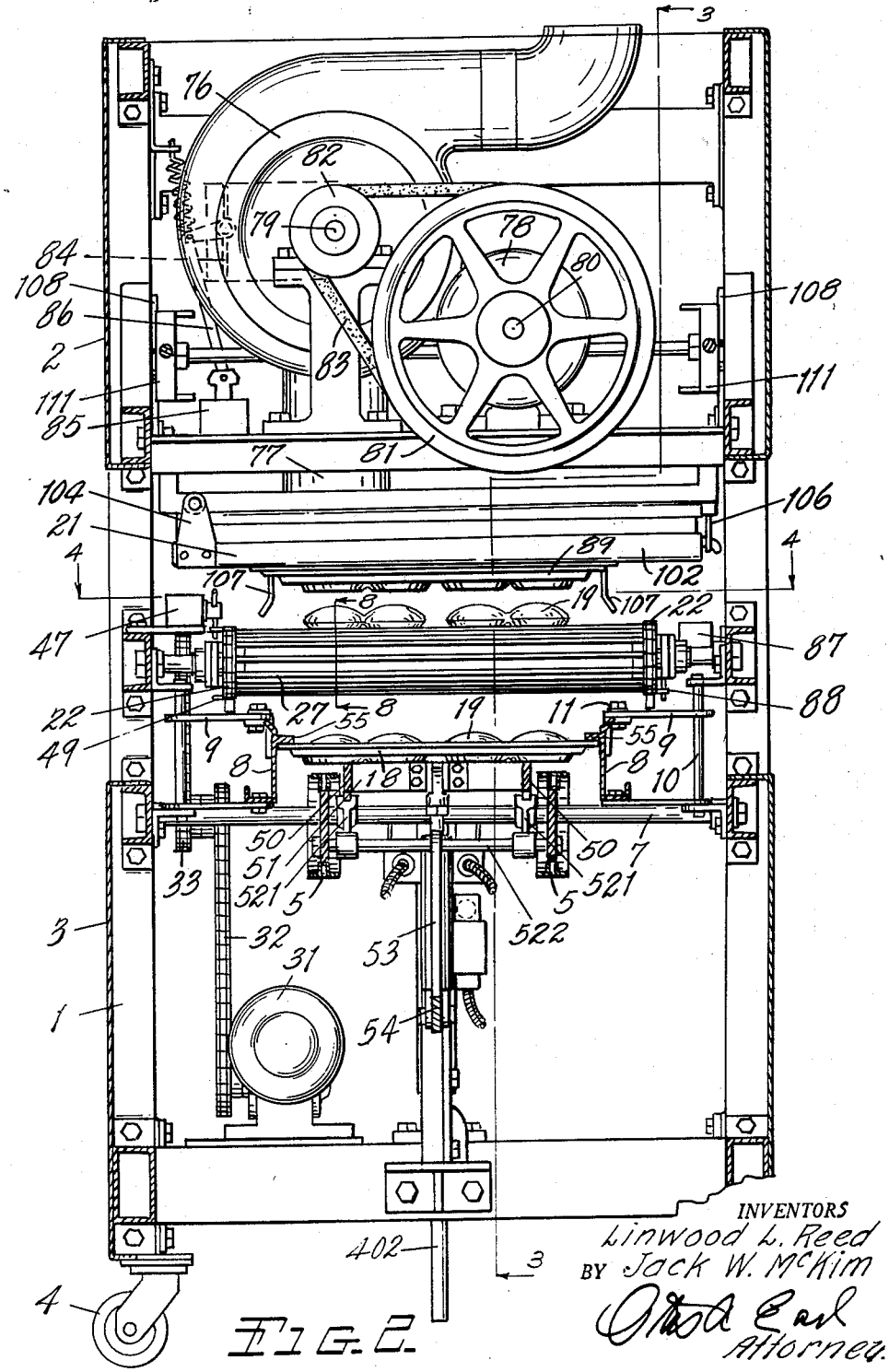

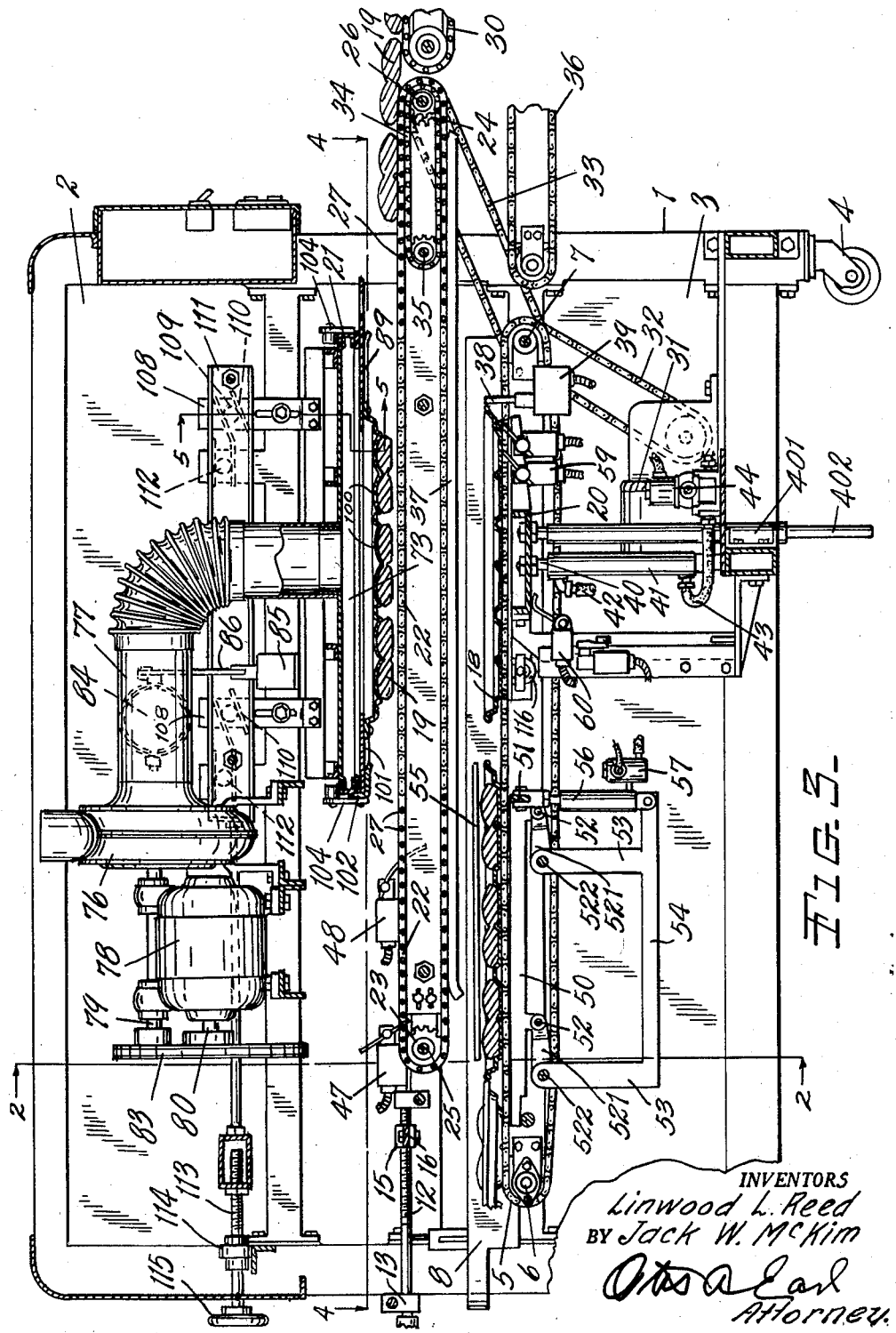

March 8, 1960  L. L. REED ET AL  2,927,707
MACHINE FOR REMOVING BAKED GOODS AND THE LIKE FROM PANS
Filed May 6, 1957  6 Sheets-Sheet 4
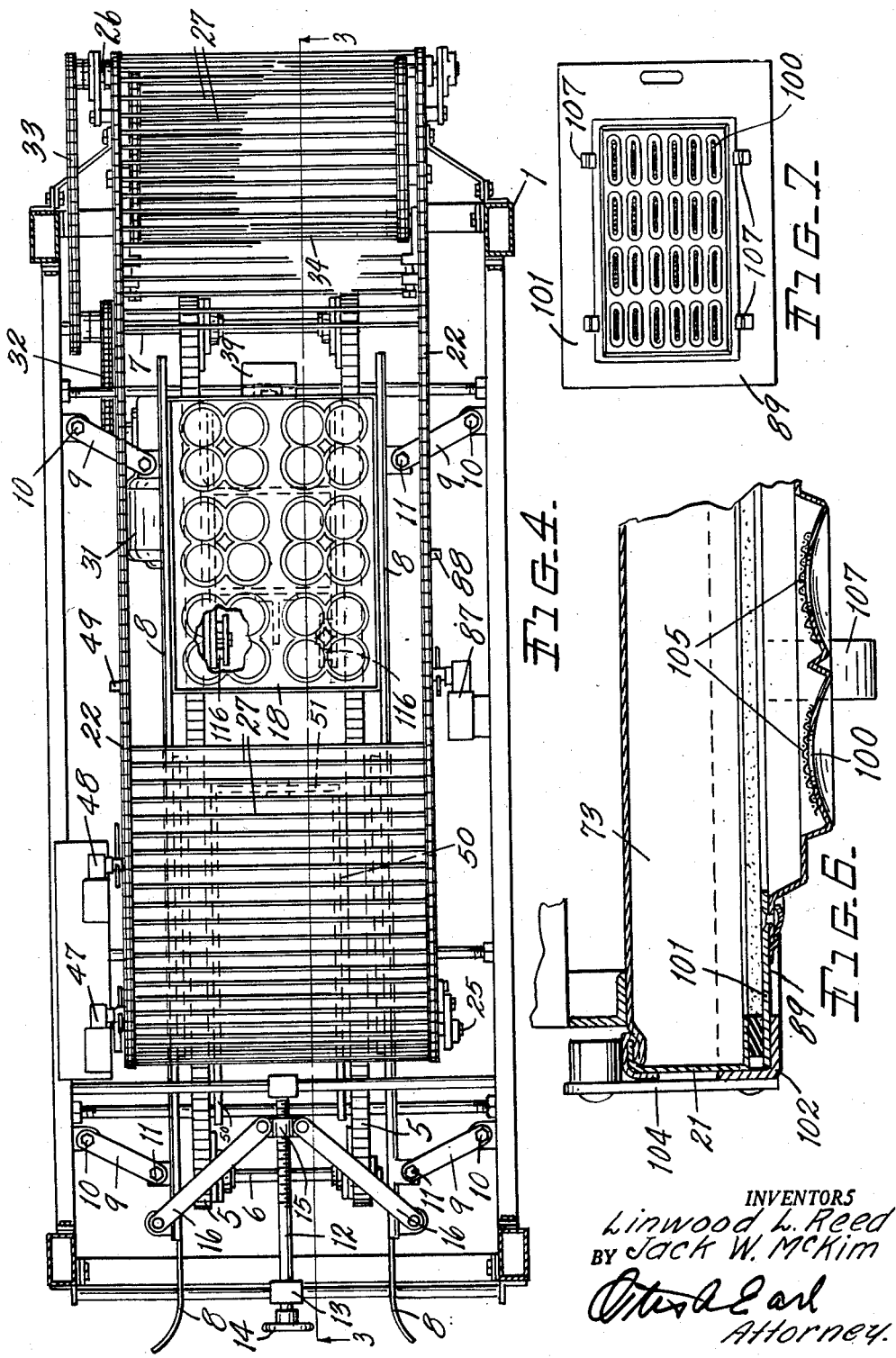
INVENTORS
Linwood L. Reed
BY Jack W. McKim
Attorney.

March 8, 1960 L. L. REED ET AL 2,927,707
MACHINE FOR REMOVING BAKED GOODS AND THE LIKE FROM PANS
Filed May 6, 1957 6 Sheets-Sheet 5

INVENTORS.
Linwood L. Reed
BY Jack W. McKim

Otto A. Earl
Attorney.

March 8, 1960 L. L. REED ET AL 2,927,707
MACHINE FOR REMOVING BAKED GOODS AND THE LIKE FROM PANS
Filed May 6, 1957 6 Sheets-Sheet 6
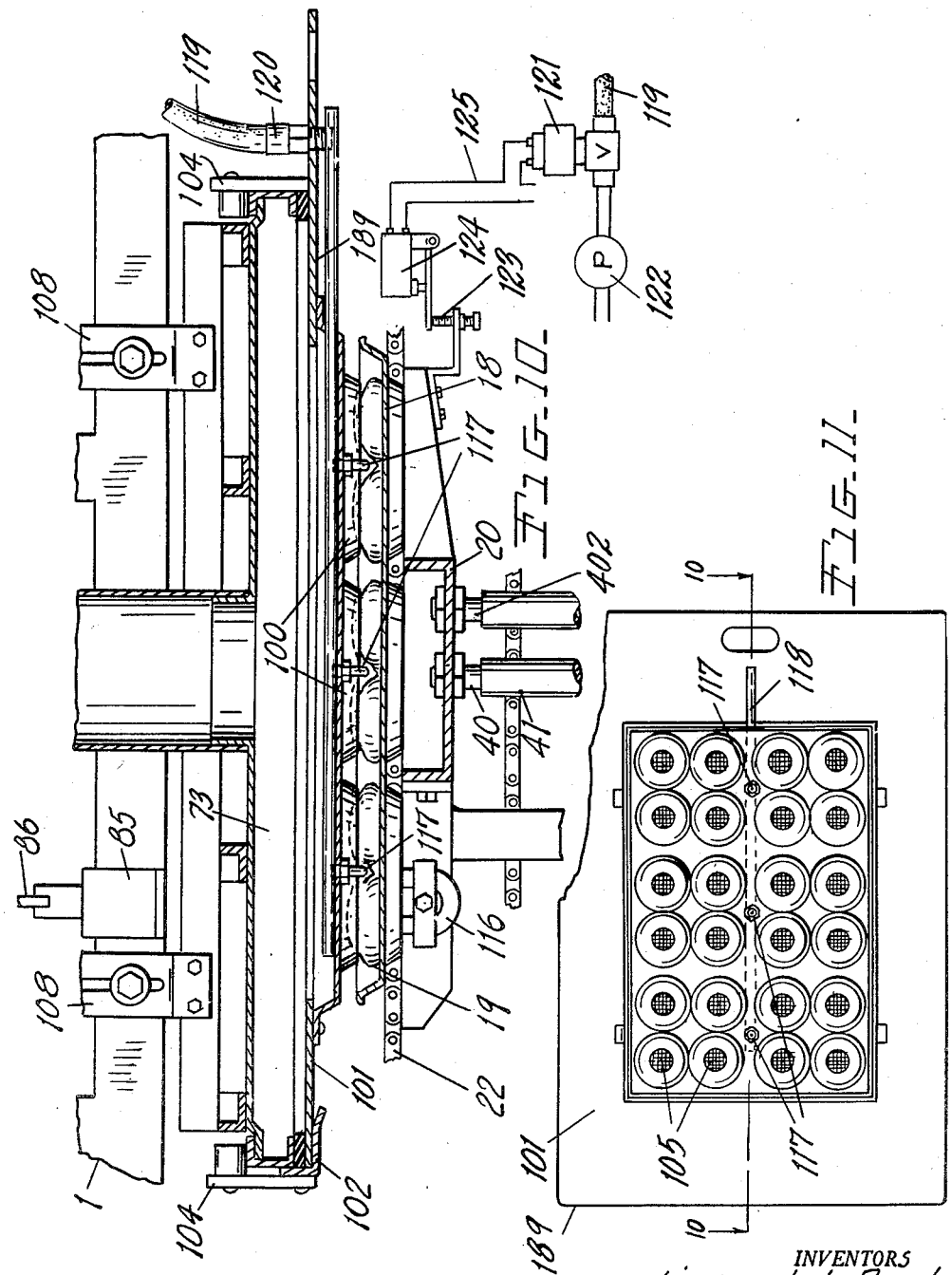
INVENTORS
Linwood L. Reed
Jack W. McKim
BY
Attorney.

United States Patent Office 2,927,707
Patented Mar. 8, 1960

2,927,707

MACHINE FOR REMOVING BAKED GOODS AND THE LIKE FROM PANS

Linwood L. Reed and Jack W. McKim, Albion, Mich., assignors to Union Steel Products Company, Albion, Mich., a corporation of Michigan Application May 6, 1957, Serial No. 657,219

25 Claims. (Cl. 214—309)

This invention relates to a machine for removing products, such for example as buns, from the pans in which they are baked. The main objects of this invention are First, to provide a machine adapted for removing products from the pans in which they are baked without injuring or disfiguring the products.

Second, to provide a machine having these characteristics which is largely automatic in operation and of large capacity.

Third, to provide a machine having these advantages which is capable of a wide range of adjustment to pans differing substantially in size and to pans having differing products groupings or positioning arrangements.

Objects relating to details and economies of the invention will appear from the description to follow. The invention is defined and pointed out in the claims.

A preferred embodiment of the invention is illustrated in the accompanying drawing, in which:

Fig. 1 is a rear perspective view of a machine embodying our invention, a loaded pan being indicated at the front or entrance end of the machine and an unloaded pan and depanned products being indicated at the discharge or rear end of the machine.

Fig. 2 is an enlarged fragmentary view in vertical section on a line corresponding to line 2—2 of Figs. 1 and 3, a loaded pan being illustrated in stopped position relative to the feed conveyor and products removed from pans being illustrated on the discharge conveyor.

Fig. 3 is a fragmentary longitudinal section on a line corresponding to line 3—3 of Figs. 2 and 4, a loaded and an unloaded pan being illustrated in operative relation to certain parts of the machine, products being conventionally indicated on the discharge conveyor and also on the suction head.

Fig. 4 is a fragmentary view in horizontal section on a line corresponding to line 4—4 of Figs. 1 and 3, an unloaded pan being illustrated in operative relation to the pan elevator.

Fig. 6 is an enlarged fragmentary view partially in vertical section, illustrating further details of the suction head.

Fig. 7 is an inverted view of a suction head face member somewhat conventionalized.

Fig. 10 is a fragmentary view mainly in vertical section on a line corresponding to line 10—10 of Fig. 11 of an adaptation of our invention in which air blasts are provided to aid in disengaging the work from the pans.

Fig. 11 is a fragmentary plan view of the suction head face member for adapter plate of Fig. 10.

Figure 8:
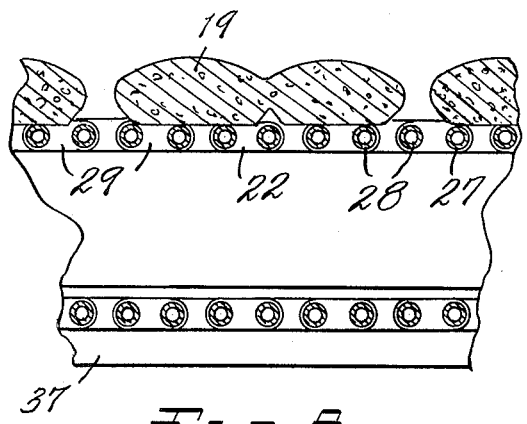
Fig. 8 is an enlarged fragmentary view in section on a line corresponding to line 8—8 of Fig. 2, illustrating certain details of the discharge conveyor, products being conventionally shown on the conveyor.
Figure 5:
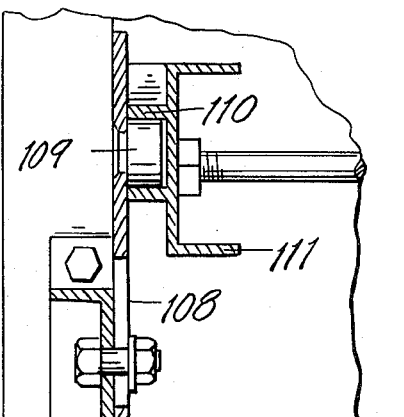
Fig. 5 is an enlarged fragmentary view in section on a line corresponding to line 5—5 of Fig. 3.
Figure 9:
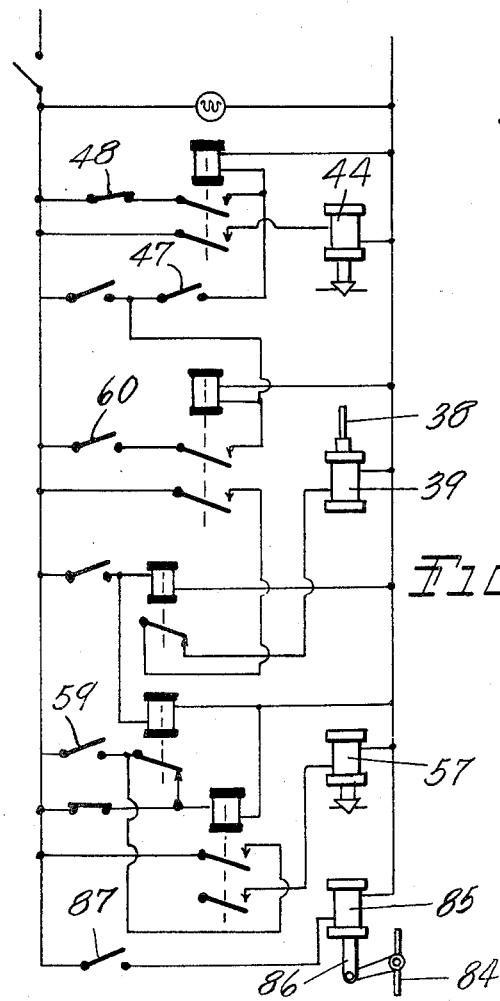
Fig. 9 is a diagrammatic view with certain of the parts control devices and switch control means associated therewith.

The embodiment of our invention illustrated in the accompanying drawing comprises a frame designated generally by the numeral 1 provided with a top housing portion 2 and lower side wall portions 3, these housing parts being arranged to permit inspection of certain of the mechanism supported by the frame.

In this embodiment, the frame is provided with caster wheels 4 so that it can be moved about as may be desirable. We are not describing the frame in detail, as that may be greatly varied and the operating mechanism may be installed in a fixed relation to other apparatus in a bakery.

The frame of the embodiment illustrated has an inlet opening at one end thereof, and a discharge opening at the other end. The pan feed conveyor of the embodiment illustrated comprises laterally spaced endless conveyor members 5 supported on suitable sprockets on the shafts 6 and 7. Pan guide members 8 are disposed at the outer sides of and in parallel relation to the conveyor members 5 and are supported for lateral adjustment by the pairs of links 9 pivotally supported on the frame at 10 and pivotally connected to the guide members at 11. These guide members are simultaneously adjusted by means of the adjusting screw 12, which is rotatably mounted at 13 on the frame and provided with a hand wheel 14. The adjusting nut 15 is connected by the links 16 to the guide members. These parts are clearly illustrated in Fig. 4.

The embodiment illustrated is provided with a feed chute 17 aligned with the feed conveyor and desirably inclined to assist in guiding the pans indicated at 18 to the feed conveyor. It will be understood, however, that other means might be provided to feed or deliver the pans to the machine.

The pans illustrated are what are commonly designated as bun pans, buns being conventionally illustrated at 19. The pans, subject to proper control, are translated by the feed conveyor and automatically positioned in operative relation to the elevator designated generally by the numeral 20.

The feed conveyor members 5 are spaced so that the head or platform of the elevator can reciprocate between them to lift the pans and bring the contents thereof into operative relation to the suction head, designated generally by the numeral 21. The discharge conveyor is disposed above and in parallel relation to the feed conveyor and between the feed conveyor and the suction head. This discharge conveyor comprises laterally spaced conveyor members 22 drivingly supported by sprockets 23 and 24 on the shafts 25 and 26 respectively. These conveyor members 22 are laterally spaced to permit the passage of a pan supported by the elevator between them.

The delivery conveyor has longitudinally spaced product-supporting units 27 which, in the embodiment illustrated, consist of a plurality of rollers 28, see Fig. 8, and are supported by the links 29 of the conveyor members 22.

These rollers are provided to minimize frictional abrading action on the products in the event of clogging of the discharged products. A delivery conveyor 30 is provided, in the embodiment illustrated, to receive the products and this is desirably of such length as to permit cooling of the products. However, chutes and other means may be provided for the products as particular circumstances or conditions may render desirable.

In the embodiment illustrated, the conveyors are driven from the motor 31 which is connected by the sprocket chain 32 to the shaft 7 of the feed conveyor, which is in turn connected by the sprocket chain 33 to the driven shaft 26 of the delivery conveyor. With this arrangement, both conveyors are continuously driven as distinguished from step-by-step operation. The products-supporting sections of the delivery conveyor are spaced so as to permit the pans to be reciprocated between them to and from operative relation to the suction head. We desire, however, to point out that the conveyors might be driven step-by-step in timed relation to the operation of the elevator. We have pointed out that the products supporting units of the delivery conveyor are made up of groups of rollers extending between the endless conveyor members 22. This minimizes abrading action on the products in the event of clogging at the delivery end of the delivery conveyor. As such clogging might permit the products supporting units to pass from under the products supported on the end of the discharge conveyor we provide an auxiliary endless delivery conveyor 34 which is supported within the main delivery conveyor by suitable sprockets on the shaft 26 and the shaft 35, see Fig. 3.

This auxiliary conveyor 34 is positioned between the conveyor members 22 of the main delivery conveyor and serves to pick up any products that may be discharged thereon as a result of the before mentioned clogging, however, no clogging is likely to occur if the cooling conveyor 30 functions properly.

The unloaded pans are returned by the elevator to the feed conveyor and discharged therefrom upon the conveyor 36. However, the pans may be discharged by the feed conveyor into a stack or upon a chute. Supports 27 are provided for the lower reaches of the discharge conveyor members 22.

The several parts have been described to show their functioning relation to each other generally considered. With the feed conveyor guide properly adjusted to the particular width of the pan, the pans may be delivered to the feed conveyor manually by sliding along the chute 17, or otherwise, to be carried along by the feed conveyor until they engage the elevator positioning stop 38, which is operated or controlled by the solenoid 39. This stop properly positions the loaded pans to be picked up by the elevator 20. The elevator 20 is actuated by a pneumatic unit and is carried by the plunger 40 thereof which reciprocates in the cylinder 41, the cylinder having connections 42 and 43 to the valve 44 and to pump and to a pressure tank, not illustrated. Elevator guide rods 401 which reciprocate in the guide 402 are provided to prevent rotation of the elevator on the plunger 40.

The air control valve 44 is controlled by the switches 47 and 48 which are positioned in spaced relation relative to the upper reach or rearwardly traveling reach of the delivery conveyor, which is provided with a switch engaging tappet 49. A second pan stop means is provided to space or time the delivery of pans to position to be engaged by the elevator. This second stop means in the embodiment illustrated, comprises a pair of pan engaging members 50 which are connected by cross bars 51 and are connected at 52 to the links 521 which are rockably supported on rods 522 on the upwardly projecting arms 53 of a fixed supporting piece 54, see Fig. 3. These members 50 are disposed between the feed conveyor members so that they may move upwardly to engage a pan and clamp it against the abutments 55 mounted on the inner sides of the guide members of the feed conveyor.

A pneumatic unit 56, controlled from the valve 57, is provided for actuating this stop device. One purpose or function of this pan stop means is to cause the pan to engage the abutments 55 with considerable force, thus jolt the pans to loosen the products from the pans so that they may be more easily picked up from the pans by the suction head. The valve 57 is controlled from the pan operated switch 59. On the return of the elevator it engages the switch 60 which controls the stop 39.

The suction head or unit designated generally by the numeral 21 comprises the suction chamber 75 which is connected to the blower 76 through the conduit 77. The blower is driven from the motor 78, the shaft 79 of the blower being connected to the shaft 80 of the motor through the driving pulley 81 on the shaft 80 and the belt 83. The pulley 81 is substantially larger than the pulley 82 on the blower shaft to increase the speed of the blower.

The suction in the suction head is controlled by a damper-like valve 84 in the conduit 77 which valve is controlled by the solenoid 85 to which it is connected by the link 86. The solenoid is controlled from the switch 87 which is actuated by the tappet 88 on one of the delivery conveyor members 22.

As there may be considerable variation in the arrangement of the products to be depanned on the pans the suction head face plate 89 is removably mounted. The face plates have downwardly facing work receiving recesses 100 which are located according to the product pattern of the baking pans, one example of which is shown in Fig. 7, and have suction openings therein.

The suction head face members have flange-like border portions 101 removably engageable with the face plate supporting frame 102. These suction openings are desirably provided with screens 105 disposed at the inner sides thereof. The face plate supporting frame is pivotally supported by hangers 104, the other end of the frame is releasably supported by the latch 106. This allows the suction head face members being released and tilted downwardly so that any collection of material may be removed therefrom. The suction heads are provided with downwardly diverging pan guides 107 which insure that the pans shall be properly centered or located to present the products carried thereby to the suction openings. To provide for vertical adjustment the hangers 108 are provided with rollers 109 which engage inclined supporting ways 110 on the horizontally adjustable support member 111 which is supported for limited horizontal adjustment on the studs or rollers 112 on the frame. The members 111 are adjusted by the threaded rod 113 which is rotatably mounted on the frame at 114 and provided with a hand wheel 115. These adjustable features provide substantial and accurate adjustment of the suction head to adapt it to pans of different sizes, shapes and patterns.

When the pan product is presented to the face member of the suction head it is gripped or held thereto by the suction in the suction head. When the suction is broken the product drops onto a supporting section of the delivery conveyor and the product is discharged onto the cooling or receiving conveyor 30. The removal of the product is facilitated by the combined jogger and feed stop. The jogger feature of the feed stop is a desirable one but for most products and pans is not essential.

As the elevator is reciprocated at high speed and in order to prevent its dropping away from the pan or the pan becoming displaced in any wise thereon, the elevator is provided with magnets 116 which engage the underside of the pan holding the pan to the elevator during its stroke. These magnets do not interfere with the pan being discharged by the elevator.

To aid in the releasing of buns or baked goods which are of a sticky character being "wet" the machine may be equipped with a modified form of suction head face plates 189 which are equipped with nozzles 117, see Figs. 10 and 11 directed downwardly against the pan in its elevated position as shown in Fig. 10, the nozzle being directed against the surface of the pan between the product pattern thereof as is illustrated. These nozzles are connected by the conduit 118 connected to a source of air under pressure by the supply conduit 119 detachably connected to the conduit 118 by the coupling conventionally indicated at 120. The supply pipe 119 is controlled by the solenoid actuated valve 121 to a pump or source of air under pressure conventionally shown at 122, see Fig. 10. The discharge of the air upon a pan is timed with the reciprocation of the elevator, the elevator being, in the embodiment illustrated, provided with a switch actuating tappet 123 for closing the switch 124, which has electrical connections 125 to the solenoid valve 121. These control parts are mainly shown conventionally, as the details thereof form no part of this invention.

The directing of the blast of air or jets of air against the pan aids materially in the releasing of products of a sticky character. They are not required for most baked goods and therefore we have not illustrated this feature in the embodiment of our invention in Figs. 1 to 9 inclusive, but it is merely a matter of substituting the suction head face plates equipped with nozzles for the suction head face plate without the nozzles. Inasmuch as the suction openings of the suction head are closed by the product, this discharge of blasts of air against the plate does not interfere with the suction hold of the product, but aids in the disengagement of the product from the pan.

We have illustrated and described our invention in a very highly practical embodiment thereof. We have not attempted to illustrate or describe numerous other embodiments or adaptations as it is believed that this disclosure will enable those skilled in the art to embody or adapt the invention as may be desired.

Having thus described the invention, what is claimed to be new and is desired to be secured by Letters Patent is:

1. A machine for removing products from pans comprising a supporting frame having entrance and discharge openings, a feed conveyor aligned with said openings and comprising laterally spaced endless conveyor members, laterally spaced pan guides disposed at the outer sides of and in parallel relation to said feed conveyor members, means for simultaneously adjusting said guide members to and from said conveyor members to guidingly receive pans of varying widths between them, a delivery conveyor disposed above said feed conveyor and comprising laterally spaced endless conveyor members and longitudinally spaced groups of product supporting cross members extending between and rotatably mounted on said endless conveyor members, said endless conveyor members and groups of product support members being spaced to permit the passage of pans therebetween, a suction head disposed in a plane above said delivery conveyor and mounted for adjustment relative thereto, said suction head being provided with a removable face member provided with a series of suction openings, a suction control means for said suction head, a pan elevator positioned when retracted below the path of travel of pans on said feed conveyor and adapted when actuated to lift pans from said feed conveyor and position the products therein in operative relation to said suction head and when retracted to return the pans to said feed conveyor, a combined pan feed stop disposed in advance of said pan elevator to control the delivery of pans thereto, means for driving said discharge conveyor synchronized to permit the passage of said elevator therethrough and to receive the products discharged from said suction head, switch controlled means for actuating said suction control means comprising a switch disposed adjacent the path of travel of the delivery conveyor, and a tappet on said delivery conveyor for actuating said switch, switch controlled means for actuating said elevator including spaced switches disposed adjacent the delivery conveyor and tappets on said conveyor for successively actuating said switches, a second pan stop disposed rearwardly of said first pan stop for positioning pans to be engaged by said elevator, switch controlled means for actuating said first pan stop including a pan actuated switch positioned to be engaged by a pan engaging said second stop, and switch controlled means for actuating said second stop including a switch actuated by the return of the elevator to retracted position.

2. A machine for removing products from pans comprising a supporting frame having entrance and discharge openings, a feed conveyor aligned with said openings and comprising laterally spaced endless conveyor members, a delivery conveyor disposed above said feed conveyor and comprising laterally spaced endless conveyor members and longitudinally spaced product supporting cross members extending between said endless conveyor members, said endless conveyor members and product support members being spaced to permit the passage of pans therebetween, a suction head disposed in a plane above said delivery conveyor and mounted for adjustment relative thereto, said suction head being provided with a face member provided with a series of suction openings, a suction control means for said suction head, a pan elevator positioned when retracted below the path of travel of pans on said feed conveyor and adapted when actuated to lift pans from said feed conveyor and position the products therein in operative relation to said suction head and when retracted to return the pans to said feed conveyor, a combined pan feed stop disposed in advance of said pan elevator to control the delivery of pans thereto, means for driving said discharge conveyor synchronized to permit the passage of said elevator therethrough and to receive the products discharged from said suction head, switch controlled means for actuating said suction control means comprising a switch disposed adjacent the path of travel of the delivery conveyor, and a tappet on said delivery conveyor for actuating said switch, switch controlled means for actuating said elevator including spaced switches disposed adjacent the delivery conveyor and tappets on said conveyor for successively actuating said switches, a second pan stop disposed rearwardly of said first pan stop for positioning pans to be engaged by said elevator, switch controlled means for actuating said first pan stop including a pan actuated switch positioned to be engaged by a pan engaging said second stop, and switch controlled means for actuating said second stop including a switch actuated by the return of the elevator to retracted position.

3. A machine for removing products from pans comprising a supporting frame having entrance and discharge openings, a feed conveyor aligned with said openings and comprising laterally spaced endless conveyor members, a delivery conveyor disposed above said feed conveyor and comprising laterally spaced endless conveyor members and longitudinally spaced product supporting cross members extending between said endless conveyor members, said endless conveyor members and product support members being spaced to permit the passage of pans therebetween, a suction head disposed in a plane above said delivery conveyor and mounted for adjustment relative thereto, said suction head being provided with a face member provided with a series of suction openings, a suction control means for said suction head, a pan elevator positioned when retracted below the path of travel of pans on said feed conveyor and adapted when actuated to lift pans from said feed conveyor and position the products therein in operative relation to said suction head and when retracted to return the pans to said feed conveyor, a combined pan feed stop disposed in advance of said pan elevator to control the delivery of pans thereto, means for driving said discharge conveyor synchronized to permit the passage of said elevator therethrough and to receive the products discharged from said suction head, an auxiliary delivery conveyor arranged within said delivery conveyor at the rear of said suction head to support and deliver products that may be deposited thereon from one of said groups of product supporting members in the event of the discharge therefrom becoming clogged, switch controlled means for actuating said suction control means comprising a switch disposed adjacent the path of travel of the delivery conveyor, and a tappet on said delivery conveyor for actuating said switch, switch controlled means for actuating said elevator including spaced switches disposed adjacent the delivery conveyor and tappets on said conveyor for successively actuating said switches, a second pan stop disposed rearwardly of said first pan stop for positioning pans to be engaged by said elevator, switch controlled means for actuating said first pan stop including a pan actuated switch positioned to be engaged by a pan engaging said second stop, and switch controlled means for actuating said second stop including a switch actuated by the return of the elevator to retracted position.

4. A machine for removing products from pans comprising a supporting frame having entrance and discharge openings, a feed conveyor aligned with said openings and comprising laterally spaced endless conveyor members, laterally spaced pan guides disposed at the outer sides of and in parallel relation to said feed conveyor members, means for adjusting said guide members to and from said conveyor members to guidingly receive pans of varying widths between them, a delivery conveyor disposed above said feed conveyor and comprising laterally spaced endless conveyor members and longitudinally spaced groups of product supporting cross members extending between and rotatably mounted on said endless conveyor members, said endless conveyor members and groups of product supporting members being spaced to permit the passage of pans therebetween, a suction head disposed in a plane above said delivery conveyor and mounted for adjustment relative thereto, a suction control means for said suction head, a pan elevator positioned when retracted below the path of travel of pans on said feed conveyor and adapted when actuated to lift pans from said feed conveyor and position the products therein in operative relation to said suction head and when retracted to return the pans to said feed conveyor, a pan feed stop disposed in advance of said pan elevator to control the delivery of pans thereto, means for driving said discharge conveyor synchronized to permit the passage of said elevator therethrough and to receive the products discharged from said suction head, means for actuating said elevator synchronized with the travel of said delivery conveyor, means for actuating said suction head control means in timed relation to the actuation of said elevator, a second pan stop disposed rearwardly of said first pan stop for positioning pans to be engaged by said elevator, means for actuating said first pan stop including a pan actuated control member positioned to be engaged by a pan engaging said second stop, and means for actuating said second pan stop including a control member actuated by the return of the elevator to retracted position.

5. A machine for removing products from pans comprising a supporting frame having entrance and discharge openings, a feed conveyor aligned with said openings and comprising laterally spaced endless conveyor members, a delivery conveyor disposed above said feed conveyor and comprising laterally spaced endless conveyor members and longitudinally spaced product supporting members extending between and rotatably mounted on said endless conveyor members, said endless conveyor members and product supporting members being spaced to permit the passage of pans therebetween, a suction head disposed in a plane above said delivery conveyor and mounted for adjustment relative thereto, a suction control means for said suction head, a pan elevator positioned when retracted below the path of travel of pans on said feed conveyor and adapted when actuated to lift pans from said feed conveyor and position the products therein in operative relation to said suction head and when retracted to return the pans to said feed conveyor, a pan feed stop disposed in advance of said pan elevator to control the delivery of pans thereto, means for driving said discharge conveyor synchronized to permit the passage of said elevator therethrough and to receive the products discharged from said suction head, means for actuating said elevator synchronized with the travel of said delivery conveyor, means for actuating said suction head control means in timed relation to the actuation of said elevator, a second pan stop disposed rearwardly of said first pan stop for positioning pans to be engaged by said elevator, means for actuating said first pan stop including a pan actuated control member positioned to be engaged by a pan engaging said second stop, and means for actuating said second pan stop including a control member actuated by the return of the elevator to retracted position.

6. A machine for removing products from pans comprising a supporting frame having entrance and discharge openings, a feed conveyor aligned with said openings and comprising laterally spaced endless conveyor members, a delivery conveyor disposed above said feed conveyor and comprising laterally spaced endless conveyor members and longitudinally spaced product supporting members extending between and rotatably mounted on said endless conveyor members, said endless conveyor members and product supporting members being spaced to permit the passage of pans therebetween, a suction head disposed in a plane above said delivery conveyor and mounted for adjustment relative thereto, said suction head being provided with a removable face member provided with a series of suction openings, a suction control means for said suction head, a pan elevator positioned when retracted below the path of travel of pans on said feed conveyor and adapted when actuated to lift pans from said feed conveyor and position the products therein in operative relation to said suction head and when retracted to return the pans to said feed conveyor, a pan feed stop disposed in advance of said pan elevator to control the delivery of pans thereto, means for driving said discharge conveyor synchronized to permit the passage of said elevator therethrough and to receive the products discharged from said suction head, means for actuating said elevator synchronized with the travel of said delivery conveyor, means for actuating said suction head control means in timed relation to the actuation of said elevator, a second pan stop disposed rearwardly of said first pan stop for positioning pans to be engaged by said elevator, means for actuating said first pan stop including a pan actuated control member positioned to be engaged by a pan engaging said second stop, and means for actuating said second pan stop including a control member actuated by the return of the elevator to retracted position.

7. A machine for removing products from pans comprising a supporting frame having entrance and discharge openings, a feed conveyor aligned with said openings and comprising laterally spaced endless conveyor members, a delivery conveyor disposed above said feed conveyor and comprising laterally spaced endless conveyor members and longitudinally spaced product supporting members extending between and rotatably mounted on said endless conveyor members, said endless conveyor members and product supporting members being spaced to permit the passage of pans therebetween, a suction head disposed in a plane above said delivery conveyor and mounted for adjustment relative thereto, said suction head being provided with a removable face member provided with a series of suction openings, a suction control means for said suction head, a pan elevator positioned when retracted below the path of travel of pans on said feed conveyor and adapted when actuated to lift pans from said feed conveyor and position the products therein in operative relation to said suction head and when retracted to return the pans to said feed conveyor, a combined pan feed stop and jogger disposed in advance of said pan elevator to control the delivery of pans thereto and acting to jog the pans for loosening the product therefrom, means for driving said discharge conveyor synchronized to permit the passage of said elevator therethrough and to receive the products discharged from said suction head, means for actuating said elevator synchronized with the travel of said delivery conveyor, means for actuating said suction head control means in timed relation to the actuation of said elevator, a second pan stop disposed rearwardly of said first pan stop for positioning pans to be engaged by said elevator, means for actuating said first pan stop including a pan actuated control member positioned to be engaged by a pan engaging said second stop, and means for actuating said second pan stop including a control member actuated by the return of the elevator to retracted position.

8. A machine for removing products from pans comprising a supporting frame having entrance and discharge openings, a feed conveyor aligned with said openings and comprising laterally spaced endless conveyor members, a delivery conveyor disposed above said feed conveyor and comprising laterally spaced endless conveyor members and longitudinally spaced product supporting members extending between and rotatably mounted on said endless conveyor members, said endless conveyor members and product supporting members being spaced to permit the passage of pans therebetween, a suction head disposed in a plane above said delivery conveyor and mounted for adjustment relative thereto, said suction head being provided with a removable face member provided with a series of suction openings, a suction control means for said suction head, a pan elevator positioned when retracted below the path of travel of pans on said feed conveyor and adapted when actuated to lift pans from said feed conveyor and position the products therein in operative relation to said suction head and when retracted to return the pans to said feed conveyor, a pan feed stop disposed in advance of said pan elevator to control the delivery of pans thereto, means for driving said discharge conveyor synchronized to permit the passage of said elevator therethrough and to receive the products discharged from said suction head, an auxiliary delivery conveyor arranged within said delivery conveyor at the rear of said suction head to support and deliver products that may be deposited thereon from one of said groups of product supporting members in the event of the discharge therefrom becoming clogged, means for actuating said elevator synchronized with the travel of said delivery conveyor, means for actuating said suction head control means in timed relation to the actuation of said elevator, a second pan stop disposed rearwardly of said first pan stop for positioning pans to be engaged by said elevator, means for actuating said first pan stop including a pan actuated control member positioned to be engaged by a pan engaging said second stop, and means for actuating said second pan stop including a control member actuated by the return of the elevator to retracted position.

9. A machine for removing products from pans comprising a supporting frame having entrance and discharge openings, a feed conveyor aligned with said openings and comprising laterally spaced endless conveyor members, a delivery conveyor disposed above said feed conveyor and comprising laterally spaced endless conveyor members and longitudinally spaced product supporting members extending between and rotatably mounted on said endless conveyor members, said endless conveyor members and product supporting members being spaced to permit the passage of pans therebetween, a suction head disposed in a plane above said delivery conveyor and mounted for adjustment relative thereto, said suction head being provided with a removable face member provided with a series of suction openings, a suction control means for said suction head, a pan elevator positioned when retracted below the path of travel of pans on said feed conveyor and adapted when actuated to lift pans from said feed conveyor and position the products therein in operative relation to said suction head and when retracted to return the pans to said feed conveyor, a pan feed stop disposed in advance of said pan elevator to control the delivery of pans thereto, means for driving said discharge conveyor synchronized to permit the passage of said elevator therethrough and to receive the products discharged from said suction head, means for actuating said elevator synchronized with the travel of said delivery conveyor, means for actuating said suction head control means in timed relation to the actuation of said elevator, a second pan stop disposed rearwardly of said first pan stop for positioning pans to be engaged by said elevator, means for actuating said first pan stop including a pan actuated control member positioned to be engaged by a pan engaging said second stop, means for actuating said second pan stop including a control member actuated by the return of the elevator to retracted position, and means for producing a limited dwell in the actuation of said elevator while it is at the limit of the upstroke including a downstroke control member and an actuating means thereof movable with said elevator.

10. A machine for removing products from pans having product patterns comprising a feed conveyor comprising laterally spaced endless conveyor members, a delivery conveyor disposed above said feed conveyor and comprising laterally spaced endless conveyor members and product supports spaced longitudinally of said conveyor members, said endless conveyor members and supports being spaced to permit the passage of pans therebetween, a suction head disposed in a plane above said delivery conveyor, said suction head being provided with a removable face member provided with a series of suction openings arranged to correspond to the product patterns of the pans, a suction control means for said suction head, a pan elevator operatively associated with said feed conveyor and positioned when retracted below the plane of travel of the pans on said conveyor and adapted when actuated to lift pans therefrom and position the product therein in operative holding relation to said suction head and to return the pans to said feed conveyor, said laterally spaced conveyor members of said delivery conveyor and said product supports thereof being spaced to permit the passage of the pans therebetween, a combined pan feed stop and jogger disposed in advance of said pan elevator to control the delivery of pans thereto and acting to jog the pans for loosening the product therefrom, a second pan stop disposed rearwardly of said first pan stop for positioning pans to be engaged by said elevator in vertical alignment with said suction head, and means for actuating said feed conveyor, said delivery conveyor, said elevator, said suction head control means and said first and second pan stops in timed relation to each other.

11. A machine for removing products from pans comprising a feed conveyor comprising laterally spaced endless conveyor members, a delivery conveyor disposed above said feed conveyor and comprising laterally endless conveyor members and spaced product supports, said endless conveyor members and supports being spaced to permit the passage of pans therebetween, a suction head disposed in a plane above said delivery conveyor, a suction control means for said suction head, a pan elevator operatively associated with said feed conveyor and positioned when retracted below the plane of travel of the pans on said conveyor and adapted when actuated to lift pans therefrom and position the products therein in operative holding relation to said suction head and to return the pans to said feed conveyor, said laterally spaced conveyor members of said delivery conveyor and said product supports thereof being spaced to permit the passage of the pans therebetween, a combined pan feed stop and jogger disposed in advance of said pan elevator to control the delivery of pans thereto and acting to jog the pans for loosening the product therefrom, a second pan stop disposed rearwardly of said first pan stop for positioning pans to be engaged by said elevator in vertical alignment with said suction head, and means for actuating said feed conveyor, said delivery conveyor, said elevator, said suction head control means and said first and second pan stops in timed relation to each other.

12. A machine for removing products from pans having product patterns comprising a feed conveyor comprising laterally spaced endless conveyor members, a delivery conveyor disposed above said feed conveyor and comprising laterally spaced endless conveyor members and spaced product supports, said endless conveyor members and supports being spaced to permit the passage of pans therebetween, a suction head disposed in a plane above said delivery conveyor, said suction head being provided with a removable face member provided with a series of suction openings arranged to correspond to the product patterns of the pans, a suction control means for said suction head, a pan elevator operatively associated with said feed conveyor and positioned when retracted below the plane of travel of the pans on said conveyor and adapted when actuated to lift pans therefrom and position the product therein in operative holding relation to said suction head and to return the pans to said feed conveyor, said laterally spaced conveyor members of said delivery conveyor and said product supports thereof being spaced to permit the passage of the pans therebetween, a pan feed stop disposed in advance of said pan elevator to control the delivery of pans thereto and acting to jog the pans for loosening the product therefrom, a second pan stop disposed rearwardly of said first pan stop for positioning pans to be engaged by said elevator in vertical alignment with said suction head, and means for actuating said feed conveyor, said delivery conveyor, said elevator, said suction head control means and said first and second pan stops in timed relation to each other.

13. A machine for removing products from pans comprising a feed conveyor comprising laterally spaced endless conveyor members, a delivery conveyor disposed above said feed conveyor and comprising laterally spaced endless conveyor members and spaced product supports, said endless conveyor members and supports being spaced to permit the passage of pans therebetween, a suction head disposed in a plane above said delivery conveyor, a suction control means for said suction head, a pan elevator operatively associated with said feed conveyor and positioned when retracted below the plane of travel of the pans on said conveyor and adapted when actuated to lift pans therefrom and position the products therein in operative holding relation to said suction head and to return the pans to said feed conveyor, said laterally spaced conveyor members of said delivery conveyor and said product supports thereof being spaced to permit the passage of the pans therebetween, a pan feed stop disposed in advance of said pan elevator to control the delivery of pans thereto and acting to jog the pans for loosening the products therefrom, a second pan stop disposed rearwardly of said first pan stop for positioning pans to be engaged by said elevator in vertical alignment with said suction head, and means for actuating said feed conveyor, said delivery conveyor, said elevator, said suction head control means and said first and second pan stops in timed relation to each other.

14. A machine for removing products from pans comprising a feed conveyor comprising laterally spaced endless conveyor members, a delivery conveyor disposed above said feed conveyor and comprising laterally spaced endless conveyor members and spaced product supports, said endless conveyor members and supports being spaced to permit the passage of pans therebetween, a suction head disposed in a plane above said delivery conveyor, a suction control means for said suction head, a pan elevator operatively associated with said feed conveyor and positioned when retracted below the plane of travel of the pans on said conveyor and adapted when actuated to lift pans therefrom and position the products therein in operative holding relation to said suction head and to return the pans to said feed conveyor, said laterally spaced conveyor members of said delivery conveyor and said product supports thereof being spaced to permit the passage of the pans therebetween, a pan feed stop disposed in advance of said pan elevator to control the delivery of pans thereto and acting to jog the pans for loosening the products therefrom, a second pan stop disposed rearwardly of said first pan stop for positioning pans to be engaged by said elevator in vertical alignment with said suction head, an auxiliary conveyor arranged within said delivery conveyor at the rear of said suction head to supportingly receive and deliver products that may be deposited thereon as a result of failure of one of said product conveyor sections to discharge at the rear of the delivery conveyor, and means for actuating said feed conveyor, said delivery conveyor, said elevator, said suction head control means and said first and second pan stops in timed relation to each other.

15. A machine for removing products from pans comprising a feed conveyor comprising laterally spaced endless conveyor members, laterally spaced pan guides disposed at the outer sides of and in parallel relation to said feed conveyor members, means for adjusting said guide members to and from said conveyor members to guidingly receive pans of varying widths between them, a delivery conveyor disposed above said feed conveyor and comprising laterally spaced endless conveyor members and product supports spaced longitudinally thereof, said endless conveyor members and supports being spaced to permit the passage of pans therebetween, a suction head disposed in a plane above said delivery conveyor, a suction control means for said suction head, a pan elevator operatively associated with said feed conveyor to lift pans therefrom and position the products therein in operative holding relation to said suction head, a combined pan feed stop and jogger disposed in advance of said elevator to control the delivery of pans thereto and actuating to jog pans for loosening the products therefrom and comprising pan abutment members mounted on said pan guides in upwardly spaced relation to the upper reaches of said feed conveyor, elongated pan engaging members disposed longitudinally of and in the upper reaches of said conveyor members to be actuated to lift pans against said abutment members and while actuated to supportingly hold the pan against said abutment members, a second pan stop disposed rearwardly of said first pan stop for positioning pans in operative relation to said pan elevator, and control means for said pan feed stop including, a switch element actuated by a pan in operative relation to said elevator.

16. A machine for removing products from pans comprising a feed conveyor comprising laterally spaced endless conveyor members, laterally spaced pan guides disposed at the outer sides of and in parallel relation to said feed conveyor members, means for adjusting said guide members to and from said conveyor members to guidingly receive pans of varying widths between them, a delivery conveyor disposed above said feed conveyor and comprising laterally spaced endless conveyor members and product supports spaced longitudinally thereof, said endless conveyor members and supports being spaced to permit the passage of pans therebetween, a suction head disposed in a plane above said delivery conveyor, a suction control means for said suction head, a pan elevator operatively associated with said feed conveyor to lift pans therefrom and position the products therein in operative holding relation to said suction head, a pan feed stop disposed in advance of said elevator to control the delivery of pans thereto, a second pan stop disposed rearwardly of said first pan stop for positioning pans in operative relation to said pan elevator, and control means for said pan feed stop including, a switch element actuated by a pan in operative relation to said elevator.

17. A machine for removing products from pans comprising a feed conveyor comprising laterally spaced endless conveyor members, laterally spaced pan guides disposed at the outer sides of and in parallel relation to said feed conveyor members, means for adjusting said guide members to and from said conveyor members to guidingly receive pans of varying widths between them, a delivery conveyor disposed above said feed conveyor and comprising laterally spaced endless conveyor members and spaced product supports, said endless conveyor members and supports being spaced to permit the passage of pans therebetween, a suction head disposed in a plane above said delivery conveyor, a suction control means for said suction head, a pan elevator operatively associated with said feed conveyor and positioned when retracted below the plane of travel of the pans on said conveyor and adapted when actuated to lift pans therefrom and position the products therein in operative holding relation to said suction head and to return the pans to said feed conveyor, said laterally spaced conveyor members of said delivery conveyor and said product supports thereof being spaced to permit the passage of the pans therebetween, a pan stop for positioning pans in operative relation to said pan elevator, and means for actuating said elevator in timed relation to the travel of said products support section of said delivery conveyor, the suction head control means being synchronized with the work stroke of the elevator.

18. A machine for removing products from pans comprising a feed conveyor comprising laterally spaced endless conveyor members, a delivery conveyor disposed above said feed conveyor and comprising laterally spaced endless conveyor members and spaced product supports, said endless conveyor members and supports being spaced to permit the passage of pans therebetween, a suction head disposed in a plane above said delivery conveyor, a suction control means for said suction head, a pan elevator operatively associated with said feed conveyor and positioned when retracted below the plane of travel of the pans on said conveyor and adapted when actuated to lift pans therefrom and position the products therein in operative holding relation to said suction head and to return the pans to said feed conveyor, said laterally spaced conveyor members of said delivery conveyor and said product supports thereof being spaced to permit the passage of the pans therebetween, a pan stop for positioning pans in operative relation to said pan elevator, and means for actuating said elevator in timed relation to the travel of said products support section of said delivery conveyor, the suction head control means being synchronized with the work stroke of the elevator.

19. A machine for removing products from pans having product patterns comprising a pan feed conveyor, a suction head disposed above said pan feed conveyor, said suction head being provided with a removable face member provided with a series of suction openings corresponding to the product pattern of the pan, a suction control means for said suction head, a pan elevator operatively associated with said feed conveyor and positioned when retracted below the plane of travel of the pans on said conveyor and adapted when actuated to lift the pan therefrom and position the products therein in suction gripping relation to said suction head and to return the pans to said feed conveyor, said laterally spaced conveyor members of said delivery conveyor and said product supports thereof being spaced to permit the passage of the pans therebetween, a product discharge means adapted to receive the products discharged from said suction head, and pan stop means operatively associated with said feed conveyor to stop pans on said feed conveyor in operative relation to said elevator, and means for synchronizingly actuating said elevator, suction head control means and said pan stop whereby the pan returned by said elevator to said conveyor may be translated thereby from operative relation to said elevator.

20. A machine for removing baked products from the pans in which the products have been baked including a feed conveyor comprising endless laterally spaced pan conveyor members spaced to support and translate a pan thereon, a delivery conveyor disposed above said feed conveyor and comprising laterally spaced conveyor members and product supports spaced longitudinally of said laterally spaced conveyor members, said endless conveyor members of said delivery conveyor being spaced to permit the passage between them of pans dimensioned to be translated on said feed conveyor, a suction head disposed in a plane above said delivery conveyor, suction control means for said suction head, a vertically reciprocable pan elevator operatively associated with said feed conveyor and positioned when in retracted position below the path of travel of pans thereon and acting when actuated to lift a pan from said feed conveyor and through an opening in said delivery conveyor to position products in the pan in operative relation to said suction head, stop means operatively associated with said feed conveyor for positioning pans translated thereby and while supported thereon in position to be engaged by said elevator, and means for actuating said elevator, said delivery conveyor and said suction control means in timed relation.

21. A machine for removing baked products from the pans including a feed conveyor, a delivery conveyor disposed above said feed conveyor and comprising laterally spaced conveyor members and product supports spaced longitudinally of said laterally spaced conveyor members, said endless conveyor members of said delivery conveyor being spaced to permit the passage between them of pans dimensioned to be translated on said feed conveyor, a suction head disposed in a plane above said delivery conveyor, suction control means for said suction head, a vertically reciprocable pan elevator operatively associated with said feed conveyor and positioned when in retracted position below the path of travel of pans thereon and acting when actuated to lift a pan from said feed conveyor and through an opening in said delivery conveyor to position products in the pan in operative relation to said suction head and on its return stroke to return the pan to said feed conveyor, and means for actuating said elevator, said delivery conveyor and said suction control means in timed relation.

22. A machine for removing products from pans or the like comprising a loaded pan feed means, a delivery conveyor having product support spaced longitudinally thereof and to provide openings in the conveyor dimensioned to receive the pans, a suction head disposed in a plane above said delivery conveyor for vertical adjustment relative thereto, suction control means for said head, a vertically reciprocable elevator disposed when in retracted position to receive pans from said feed means, said elevator when in fully actuated position being adapted to support products therein in operative relation to said suction head, means for actuating said elevator and said delivery conveyor in timed relation so that an opening in said delivery conveyor is aligned with said elevator on the actuation thereof, and means for controlling said suction head in timed relation to said delivery conveyor so that the suction head discharges upon a product receiving portion of said delivery conveyor.

23. A machine for removing products from pans or the like comprising a loaded pan feed means, a delivery conveyor having product support spaced longitudinally thereof and to provide openings in the conveyor dimensioned to receive the pans, a suction head disposed in a plane above said delivery conveyor, suction control means for said head, a vertically reciprocable elevator disposed when in retracted position to receive pans from said feed means, said elevator when in fully actuated position being adapted to support products therein in operative relation to said suction head, means for actuating said elevator and said delivery conveyor in timed relation so that an opening in said delivery conveyor is aligned with said elevator on the actuation thereof, and means for controlling said suction head in timed relation to said delivery conveyor so that the suction head discharges upon a product receiving portion of said delivery conveyor.

24. A machine for removing products from pans comprising a pan feed means, a product delivery conveyor disposed above said pan feed means and comprising laterally spaced conveyor members and product supports spaced longitudinally of said laterally spaced conveyor members to provide openings therein dimensioned to permit the passage therethrough of pan supported products, a suction head disposed in a plane above said delivery conveyor for vertical adjustment relative to the plane thereof, time suction control means for said head, timed actuating means for said delivery conveyor, and a vertically reciprocable elevator operatively associated with said pan feed means to receive pans therefrom and operatively timed relative to the time operation of said delivery conveyor and said suction head to translate the products of the pan to said suction heads through said openings in said delivery conveyor, said timed suction control means and timed delivery conveyor actuating means being synchronized with each other and with said elevator.

25. A machine for removing products from pans comprising a pan feed means, a product delivery conveyor disposed above said pan feed means and comprising laterally spaced conveyor members and product supports spaced longitudinally of said laterally spaced conveyor members to provide openings therein dimensioned to permit the passage therethrough of pan supported products, a suction head disposed in a plane above said delivery conveyor, time suction control means for said head, timed actuating means for said delivery conveyor, and a vertically reciprocable elevator operatively associated with said pan feed means to receive pans therefrom and operatively timed relative to the time operation of said delivery conveyor and said suction head to translate the products of the pan to said suction heads through said openings in said delivery conveyor, said timed suction control means and timed delivery conveyor actuating means being synchronized with each other and with said elevator.

References Cited in the file of this patent

UNITED STATES PATENTS

| | | |
|---|---|---|
| 1,377,136 | Lawrence et al. | May 3, 1921 |
| 2,101,677 | Hagemeyer | Dec. 7, 1937 |
| 2,253,283 | Minaker | Aug. 19, 1941 |
| 2,271,937 | Engels | Feb. 3, 1942 |
| 2,323,174 | Wikle | June 29, 1943 |
| 2,635,773 | Ardell | Apr. 21, 1953 |
| 2,656,060 | Fischer et al. | Oct. 20, 1953 |